(12) United States Patent
Sparkman

(10) Patent No.: US 6,393,758 B1
(45) Date of Patent: *May 28, 2002

(54) FISHING FLY AND METHOD OF MAKING FISHING FLIES

(76) Inventor: Frank W. Sparkman, 3114 Escalante Ave., Idaho Falls, ID (US) 83404

( * ) Notice: Subject to any disclaimer, the term of this patent is extended or adjusted under 35 U.S.C. 154(b) by 0 days.

This patent is subject to a terminal disclaimer.

(21) Appl. No.: 09/163,364

(22) Filed: Sep. 29, 1998

Related U.S. Application Data

(63) Continuation-in-part of application No. 09/032,775, filed on Feb. 28, 1998, now abandoned, which is a continuation-in-part of application No. 08/637,170, filed on Apr. 24, 1996, now abandoned.

(51) Int. Cl.[7] ............................................... A01K 85/08
(52) U.S. Cl. .................... 43/42.53; 43/42.25; 43/42.37
(58) Field of Search .......................... 43/42.53, 42.32, 43/42.37, 42.25

(56) References Cited

U.S. PATENT DOCUMENTS

| 1,557,083 A | 10/1925 | Peckinpaugh | |
| 2,148,799 A | 2/1939 | Bilinski | 43/48 |
| 2,351,717 A | 6/1944 | Soff | 117/37 |
| 2,501,723 A | 3/1950 | Harvey | 43/42.28 |
| 2,696,693 A | 12/1954 | Markquart | 43/42.28 |
| 2,754,612 A | 7/1956 | Means | 43/42.25 |
| 2,775,055 A | 12/1956 | Waugh et al. | 43/42.25 |
| 4,550,679 A | 11/1985 | Pipa et al. | 118/52 |
| 4,731,948 A | 3/1988 | Helton | 43/42.33 |
| 5,097,621 A | 3/1992 | Hnizdor | 43/42.32 |
| 5,146,707 A | 9/1992 | Nichols | 43/42.53 |
| 5,195,269 A | 3/1993 | Black et al. | 43/42.25 |
| 5,209,008 A | 5/1993 | Kasznica | 43/42.53 |
| 5,372,506 A | 12/1994 | Hambright | 434/84 |
| 5,482,582 A | 1/1996 | Puglisi | 156/74 |
| 5,537,770 A | 7/1996 | Storm et al. | 43/42.22 |

*Primary Examiner*—Kurt Rowan
(74) *Attorney, Agent, or Firm*—Flanagan & Flanagan; John R. Flanagan

(57) ABSTRACT

A method for making fishing flies which utilizes water borne acrylic emulsion to form body parts of the fly. The water borne acrylic emulsion can be applied to the hook, or it can be applied to traditional fly-tying materials. Other materials can be inserted into the water borne acrylic emulsion before it has dried, such as filaments of plastic or hair which will form the legs, wings or other body parts of the fly. The water acrylic borne acrylic emulsion can be formed into body parts which are remote from the body of the fly, such as feet, knee joints, antennae tips. Any desired color can be achieved by mixing from a selection of colored water borne acrylic emulsions. Increased buoyancy of the fly can be achieved by using buoyant materials with the water borne acrylic emulsion to form body parts. The use of this method of tying flies results in the elimination of much of the actual tying which is presently required to tie flies. It also results in a greater variety of colors and body shapes, enhanced weighting or flotation characteristics, more realistic simulation of insects, improved durability of the fly, and decreased labor required to make the fly.

6 Claims, 3 Drawing Sheets

FISHING FLY AND METHOD OF MAKING FISHING FLIES

This application is a continuation-in-part of application Ser. No. 09/032,775 filed Feb. 28, 1998 entitled FISHING FLY AND METHOD OF MAKING FISHING FLIES abandoned, which is a continuation-in-part of application Ser. No. 08/637,170 filed Apr. 24, 1996 entitled METHOD AND DEVICE FOR USING WATERPROOF PAINT TO MAKE AND COLOR BODY PARTS OF FISHING FLIES which is abandoned.

BACKGROUND OF THE INVENTION

1. Technical Field

This invention generally relates to artificial flies used in fishing, and a method of making those flies. More particularly, this invention relates to fishing flies and a method of making fishing flies which utilizes a water borne acrylic emulsions to form simulations of the body parts of insects, and which allows the attachment of body parts without the need for tying.

2. Background

There are many different styles of fishing and many of them involve the use of a lure, spinner, artificial fly or other attractant. Fly fishing is a style of fishing in which a very light weight "fly" is attached to the end of a fishing line. The word "fly" is used to describe the device which attracts the attention of the fish and causes it to strike. This "fly" can be a construction which is designed to simulate the general shape, color, size, and look of a fly or other insect which is in the fish's environment. However, the use of the word "fly" is not intended to limit the invention to devices which simulate a fly. Other insects than flies and other creatures than insects are simulated and their simulation is still called a fly. This can include beetles, grasshoppers, bees, ants, larval stages of insects, insect larval cases, fish eggs, shrimp, frogs, mice, worms, spiders and other fresh and salt water creatures. When used in fly fishing, all of these artificial fish attractants are described as the "fly".

In fly fishing, the fishing line at the point of attachment to the fly is typically monofilament and very fine, and gradually tapers to a thicker diameter toward the fisherman. The portion closest to the fisherman is typically a thicker and heavier section of line, is colored and opaque, and may float on water or sink, or just the tip may sink. This heavier line is threaded through the eyelets on a fishing pole and is wound on a fishing reel which is held near the fisherman's hand on the pole. Using the fly fishing method of fishing, the rod, which is a very flexible device of varying lengths and diameters, is used in a whip-like fashion to extend the heaviest section of fishing line to a point where the fisherman believes the fish may see the fly or be in hiding in wait for food. The rod is used to whip the heavy line back and forth until enough line is extended that if it is allowed to drop to the water, the fly will be in proper position in front of the fish. Because of the whipping action of fly fishing, the fly must be very light in weight, since it is the heavier portion of the line which is cast, and the fly is just carried along with it. The light weight of a fly does not interfere with whipping the line back and forth, and also allows certain flies to float on top of the water and not sink beneath the water. This floating action aids in the simulation of natural insects and results in a more natural presentation to the fish. Because of the need for light weight materials in the fly so that it can be whipped back and forth with the line and so that it will lay on the water without sinking like its natural counterpart would, flies are typically made using extremely light weight material such as animal hair, birds' feathers, and sometimes foam for wings. Other flies are designed to sink, and may even have weight attached to aid in sinking.

The use of hand-tied simulations of insects on a hook, used to catch fish has been well known for centuries, and thousands of patterns exist. Each pattern is made of a variety of materials and any particular pattern may specify hair or feathers taken from specific species of animals, as well as from a specific body part of those animals.

Several strategies in the design of fishing flies have evolved. One strategy is to make the artificial fly look and react as similar to a natural insect as possible. To achieve this, feathers, hair, plastic, various types of string, beads, lead strips, and other materials are tied to the hook to simulate a specific species of insects, including their wings, head, eyes, thorax, wing covers, legs and antennae. Other creatures in the fish's natural environment are also simulated using artificial flies. These include the eggs of fish, insects, insect larvae, larval cases, small mammals such as mice, shrimp, frogs, dragon flies, worms, minnows, bait fish and crustaceans.

Another strategy in preparing flies for catching fish is not to closely simulate an insect/other in their environment, but to create a garish insect-like artificial fly which stimulates the fish to strike at it, either when protecting the fish's spawning territory, or in hostile response to the approach of the artificial fly.

What all artificial flies have in common is that they are tied to the hook using knots and some type of string. This is time consuming and requires good eyesight, knowledge of knots, a potentially vast inventory of a variety of materials and tools for tying material on the hook. This technique also presents a problem when trying to simulate certain body parts of an insect's/other anatomy through the use of tied fur, feathers or string. For instance, when tying an artificial fly which resembles a grasshopper, simulating the grasshopper's hind legs, with their thick thighs, bulbous knee joint, and back-turned foot, is difficult. Antennae bulbs of an insect are also difficult to simulate using hair and feathers.

To create flashy colors which cause a fish to strike at it out of a protective instinct or from an aggressive instinct, various threads, strings, films, tape and tinsel are used which can be luminescent, fluorescent, neon, pearlescent, reflective, shiny or glittery. Such materials are used in various combinations to create any shape, pattern, or color desired. Achieving these simulations is time consuming and intricate work and still requires tying and a large inventory of materials.

Another problem created by traditional fly tying methods is that when a body part on the fly is a large and bulky body part, the typical fly tying materials which are used to simulate this body part are such things as thread, pile, fur, feathers, etc. These materials are water absorbent and cause the body of such a fly to become heavy when it is water logged. This results in difficulty when casting, since the basis of casting in fly fishing is to cast the heavier portion of the line, rather than the fly. The fly must be very light in weight so as not to interfere with the casting of the line. A bulky fly which is soaked with water may interfere with proper casting technique.

Sometimes it is desirable that a fly sink quickly. For instance, if a person is casting upstream he might want his fly to sink quickly to the bottom of the river or stream to a depth at which the bigger fish are likely to see it. To facilitate this fast sinking, weights can be incorporated into the design of the fly in the form of beads of lead, bismuth, or other heavy material. Sometimes a fisherman may decide in the field that he needs more weight in a fly, and he can attach strips of thin weighted material such as lead, bismuth or other materials. Either weighted beads or weighted strips are usually tied on to the fly to add weight. The tying is time consuming, and can result in a fly with an un-natural appearance.

Accordingly, one of the objects of the present invention is to provide a method of making artificial flies which allows water borne acrylic emulsions to be used to simulate body parts of the creature being simulated without the use of tying knots with thread.

Another object of the present invention is to provide a method of making artificial flies in which body parts of the flies are of the desired color and shape, are light in weight, and do not absorb water.

Another object of this invention is to eliminate the need of a large inventory of fly tying materials in order to tie a wide variety of flies.

Another object of the present invention is to provide a method by which traditional fly tying materials can be dyed to any desired color, or by the use of glitter, can be made to appear speckled.

Another object of the present invention is to provide a method of securing and disguising beads, strips or threads of material added to the fly for weight.

Another object of the present invention is to provide a method of anchoring and covering beads or pieces of lightweight material such as foam, which are added for buoyancy.

Another object of the present invention is to provide a method for creating fishing flies utilizing a water borne acrylic emulsion, which results in flies which have the durability to be in the water without dissolving.

Still another object of the present invention is to provide a method for creating fishing flies utilizing water borne acrylic emulsion which creates buoyancy effects in the fishing flies by the formation of bubbles within the water borne acrylic emulsion structures.

Still another object of the present invention is to provide a cure and heat treatment method for increased durability of the water borne acrylic emulsions used in making flies.

DISCLOSURE OF INVENTION

These objects, along with others, are accomplished by the use of water borne acrylic emulsions, of the type used on fabrics and crafts, to color parts of a fly, create simulations of body parts on fishing flies and to serve as the "glue" in which appendages are anchored. These types of paints are waterborne acrylic emulsions. Although water borne, the acrylic emulsion can be made somewhat waterproof with adequate drying, and when dried is reasonably waterproof. The water borne acrylic emulsion, semi waterproof when dried, can be applied using a small brush or other suitable tool. By the use of a cure and heat treatment step, flies made by the invention become quite waterproof, and durable enough for extended use in the water.

With the use of a curing step and a heat treatment step, bubbles can be formed in the clear water reducible borne acrylic emulsion, and those bubbles can be set by the appropriate heat treatment (temperature) and time (length of heat treatment) in order to achieve different floatation characteristics of the fly or body part, depending upon the types of materials being utilized to construct the fly and/or the body parts to be utilized in the construction of flies. These trapped bubbles of air create a buoyancy effect, causing the flies to float on the surface, or at various depths, depending upon the extent of bubble formation and entrapment. An alternate version of the invention results in flies which include membranous body parts, in which the membranes are formed from water borne acrylic emulsion paint with strengthening fibers spread throughout the membrane of water borne acrylic emulsion, and with entrapped bubbles optionally within the water borne acrylic emulsion based membrane and within the fibers. When bubbles are included in such a membrane, a buoyancy effect of the membrane is added to the fly. The membrane is made of a layer or layers of water borne acrylic emulsion acrylic paint mixed with fibrous materials, with or without bubbles, and can be used to form insect wings, wing covers, scoops for oscillation, or other body parts if rolled into a tube, shaped by compression, cut to the desired shape and/or shaped by a suitable mold, such as head, thorax and abdomen sections, legs, or antennae.

The water borne acrylic emulsion are mixed to achieve the desired color from a selection of colors, and applied to either the hook itself or to fly tying materials which are tied or attached to the hook. In this way, the water borne acrylic emulsions colors are formed into the head, thorax or abdomen of an insect on the hook, or colors or is formed into eyes on the head, or is formed into simulations of feet, knee joints, or antennae tips of the fly.

The water borne acrylic emulsion, after being mixed for color, can also be mixed with granules of a closed-cell foam material. This mixing results in a mass of foam and paint which can be shaped into larger body parts on the hook. When dry, the paint acts as a cement holding the foam granules together. Thus, the bulk of the body part is made of foam granules which are held together by dried water borne acrylic emulsion. The water borne acrylic emulsion imparts a color to the body part, and the foam granules provide the property of being lighter than water, very lightweight for casting, and non-absorbent. One type of foam which works especially well is granules or pieces of styrofoam. The use of other foams is also very practical to utilize foam's characteristics to simulate an insect part.

When the water borne acrylic emulsion is cured and heat treated, the fly may be used for fishing. This method results in flies which have a different appearance than traditional flies, which may prove advantageous under certain conditions when fish are not accepting traditional flies. The method is also a means to modify traditional flies, or as a complete replacement for traditional flies. A kit of colors can be used in the field to color a neutral colored fly to match the insect which the fish are feeding on that day. The body parts of these flies more closely resemble real insects, in that they can have solid body parts rather than body parts made to look solid by the use of hair and feathers. Flies made using this method also can be made with fairly bulky body parts, but which are very light in weight and do not hinder the casting of the fly fishing line. Since these body parts are not water absorbent, they do not absorb water and become heavier for casting, as traditional fly-tying materials do. Flies made in this method can have realistic appearing appendages inserted or layered over into the water borne acrylic emulsion while it is wet, and these will be held firmly in place when the water borne acrylic emulsion is cured and heat treated.

Another aspect of the invention utilizes water borne acrylic emulsions to form and attach eye spots for insects/other. Layers of paint are added to a flat surface in concentric circles of different colors. The different colors form an eye spot. When the eye spots are cured for 3 to 6 hours, dried, they can be removed from the flat surface, which can be metal, glass, waxed paper or other surface to which the water borne acrylic emulsion does not permanently adhere. The eye spots can then be applied to a partially dry or dry body of a fly, with clear water reducible borne acrylic emulsion being used as a "glue" underneath the eye spot and around the edges, or covered completely. The fly can then be further cured, permanently affixing the eye spot to the fly body. The curing and heat treatment process can be utilized to complete fusion and/or attachment.

Flies made using the method of the invention can be made with beads, strips or pieces of material anchored to the body of the fly, and disguised as insect body parts, in which the beads, strips or other material are added for purposes of weight or buoyancy. Foam, wood, cork or plastic shapes can be attached for buoyancy, or blended into the water borne acrylic emulsion mix.

BEST MODE FOR CARRYING OUT INVENTION

Figure 1:
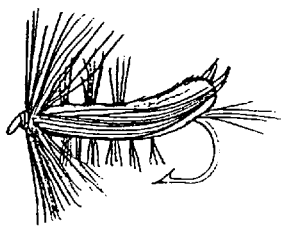
FIG. 1 is a side view of a prior art fishing fly which simulates the shape of a grasshopper.
Figure 2:
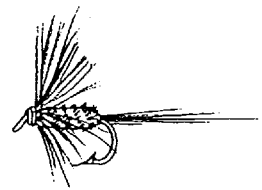
FIG. 2 is a side view of an Adams fly pattern.

In FIGS. 1 and 2 there are shown examples of prior art fishing flies (FIGS. 1 and 2) and in FIGS. 3 through 10 and 12 fishing flies made using water borne acrylic emulsion. The type of paint which has proven the best for the invention is a water borne acrylic emulsion made for painting designs on fabrics. Best results have been achieved in the present invention using Tulip Slick Fabric Paint, originally manufactured by Tulip Productions but now manufactured by Duncan, and Fluorescent and Neon Fabric Craft Paints by Palmer Paint Products. All of these are water borne acrylic emulsion latex polymer paint. The Tulip water borne acrylic emulsions are somewhat thicker than the Palmer water borne acrylic emulsions, and lend themselves especially well to building up thick body parts. The Palmer water borne acrylic emulsions are somewhat thinner, and include a clear water reducible water borne acrylic emulsions, which has a gloss or satin finish, and enhances the appearance of other colors of water borne acrylic emulsions if applied as a finish coat. The Palmer clear paint is a water borne acrylic emulsion. Other water borne acrylic emulsions with similar color and viscosity characteristics and solubility properties could be used with satisfactory results.

All three coloration materials which are water borne acrylic emulsions can be applied singularly on different materials, such as thread, and cured and heat treated. However, only the clear water reducible water borne acrylic emulsion has been found to produce bubbles when heated. Tulip dimensional water borne acrylic emulsions will have a gloss finish. Palmer clear water reducible water borne acrylic emulsion will have a gloss finish. A satin finish is available using Palmer water borne acrylic emulsion. The fluorescent, luminous and natural color water borne acrylic emulsion will appear flat. The luminous water borne acrylic emulsion is a neutral color (yellowish cream) and can be mixed, covered by, and/or blended with the Palmer clear and coloration materials which will affect the color and/or glow emanating from the luminous material. Application of clear provides a gloss finish when applied over fluorescent and natural color acrylic water borne acrylic emulsion. Portions of a fly may be coated with a second coat of clear to provide a combination of flat and gloss finish.

Although water borne, the water borne acrylic emulsion can be made somewhat waterproof with adequate drying, and when dried could be called waterproof. When a curing and heat treatment step is added to the process, the fly made from water borne acrylic emulsion becomes truly waterproof, and has excellent durability in water. The water borne acrylic emulsion can be applied using a small brush or other suitable tool. The water borne acrylic emulsion is mixed to achieve the desired color from a selection of colors, and applied to either the hook itself or to fly tying materials which are tied or attached to the hook.

One preferred method of the invention is practiced by tying fly making materials to a conventional fly hook. These materials can include hair, feathers, string, chenille, rubber filaments or tubes, strips of reflective foil, manmade fibers, glitter, or other materials used to make flies. To these materials, colorful water borne acrylic emulsion of the type described above is added to make body parts of the fly. The fly is allowed to cure, or alternatively can be subjected to a heat treatment step. The cure and heat treatment step hastens drying time, and greatly increases the fly's durability in the water. With the cure and heat treatment step, flies of the invention can be fished all day, with the immersion in water that results, with no sign of dissolution.

Another preferred method of the invention is to apply the water borne acrylic emulsion directly to a hook, without first tying any fly tying material to the hook. In this way, the water borne acrylic emulsion can be used to form the head, thorax, and abdomen of insects, or the body parts of larval and nymphal stages of insects, or other body parts of aquatic creatures, such as fish eggs, worms, spiders, minnows, baitfish and other aquatic creatures. In this preferred embodiment of the invention, the water borne acrylic emulsion can be used as an adhesive to attach fly making materials, such as weights, floatants for buoyancy, of materials to form antennae, legs, wings, wing covers, or other body parts.

Particles of foam, wood (sawdust or powder), plastic, or other materials can also be mixed with the water borne acrylic emulsion of the invention, to add bulk for forming body parts, or to add buoyancy.

Another method of adding buoyancy is by using a curing and a heating step or steps to create bubbles in the clear water borne acrylic emulsion. This method for creating buoyancy in flies is discussed below.

If a fly prepared by the method of the invention is cured at ambient temperature, a maximum durability is achieved in about 72 hours, and that is the preferred curing time at ambient temperature before fishing. A shorter preparation time is possible with a 6 to 8 hour minimum ambient Curing period, followed by the heat treatment step. Alternatively, after a 3 or 4 hour period of curing at ambient temperature, a fly can be subjected to the heat treatment step. The heat treatment step is to place the fly in an oven at 100° F. for 30 to 60 minutes, or longer. The lower the temperature, the longer the possible duration of heating, and the harder and more durable (resistant to dissolution in water) the flies become. During the curing and heat treatment step, some materials may change shape, such as foam, synthetic materials, or plastics. These changes in shape can be enhancements to the fly to achieve a particular effect. The curing and heat treatment step can be applied to either of the two preferred embodiments described above. Curing and heat treatment is especially helpful on small flies, such as nymphs or glass bead flies. After the curing step of 3 to 8 hours, very small flies may be heat treated for a minimum of fifteen (15) minutes, but the preferred heat treatment curing and curing time is thirty (30) to sixty (60) minutes.

Glitter may be applied in the second coat or finish coat. To provide a similar rough finish before curing and heat treatment, other material such as fine granules, sand, plastic, and other natural and synthetic materials may also be applied in this coat to vary the texture and weight of the fly.

Attractants, such as cinnamon, garlic, artificial flavors, herbs, salt, sugar, shrimp flavor, garlic flavor, cheese flavor, and other flavored materials can be placed in the final coat of water borne acrylic emulsion and made solid with the heat treatment process. Additional layers of this water borne acrylic emulsion with a chemical attractant may be later applied to refresh the smell on these flies. Curing and heat treatment may be used to insure proper hardening of the acrylic water borne acrylic emulsion with chemical attractants.

Natural and synthetic materials can be sprinkled on the final finish of the fly, or a portion of the fly may be dipped into, or pressed on these materials in order to obtain different surface textures when cured and heat treated. For example, fibers of polypropylene, or zeelon, can be thus embedded in an outer layer and will curl when heat treated. Other fibers, such as antron, do not curl when heat treated. This technique can be applied to nymphs, dries, larvae, insect cases, terrestrials, bass and salt water flies, etc.

Synthetic and natural materials which comprise a tied fly can be shaped or positioned on the fly and held in place by the heat treatment process. This is accomplished by holding or pressing the synthetic or natural materials against the clear water borne acrylic emulsion finish portion of the fly during heat treatment. Rubber bands, trash bag twisties and tying materials are utilized to accomplish this. The clear final finish softens and the fibers penetrate this water borne acrylic emulsion, and when the fly is removed from the heat source, these fibers remain in place. This could be called heat shaping and attachment. A synthetic product named "Fish Hair" is very compatible with this process.

Decreasing the curing time and then heat treating for durability may be desirable in developing coloration and texture changes in order to make flies more realistic and/or novel. Too short a curing time of the water borne acrylic emulsion may cause fogging. This could be a realistic appearance on a nymph, fanciful or other fly. Too many costs of clear water reducible water borne acrylic emulsion will cause a bubbled effect on the fly. This can be a very desirable effect on some flies, such as nymphs, larvae, fanciful or other flies. Heat treatment is required on such clear coated flies. These bubbles provide buoyancy to the fly.

Shaping synthetics during the curing and heat process is very desirable. Materials which are attached to become a hackle on a fly or the completed fly configuration in the shape of fins, tails, simulated bodies or parts of bodies, can be developed with the heat process. For example, fish hair, a fly tying material, has memory in the water and will return to the heat treatment shape or configuration in water, thus providing the ability to tie a fly with a taller, wider, thinner, or other profile.

A coat of glitter can be applied to water borne acrylic emulsion saturated chenille yarn. The glitter is applied by:

(1) Saturating the chenille with clear water reducible water borne acrylic emulsion (note: chenille is considered a yarn);

(2) If coloring, using an applicator to apply dots of one or a number of colors where so desired on the saturated chenille;

(3) Dipping the ends of brush bristles into clear water borne acrylic emulsion and then into the glitter, and with the brush bristles at a 90° angle to the saturated chenille, tapping the ends of the bristles into this material. The brush will unload glitter and blend coloration dots at the same time. Endless color combinations of glitter are available if desired.

Delineation of body parts during the heat treatment process can be achieved by the use of rubber bands, twist ties, tying materials, weights, dull and sharp objects and other materials. For example, chenille applied on a hook and saturated with clear water borne acrylic emulsion is made to look like segmentation on the thorax by the use of rubber bands. The rubber bands are applied before heat treatment and removed after a few minutes of heat treatment. The indentations formed by the rubber bands will remain, and then the heat treatment process can be completed.

If shrinking of foam on a fly is desired, to decrease floatation or to shrink fit the foam around other parts, a temperature of about 225 degrees F for a short period of time such as 5 or 10 minutes, can be utilized to shrink the foam parts.

The degree of non-buoyancy can be determined by a reduction in size of the foam in relation to the water borne acrylic emulsion, or it may be tested by placing the fly in water. To complete the water borne acrylic emulsion hardening and bonding to the materials and the hook, the fly can next be heated for about 30 to 60 minutes at 100° to 175° or longer.

Figure 9:
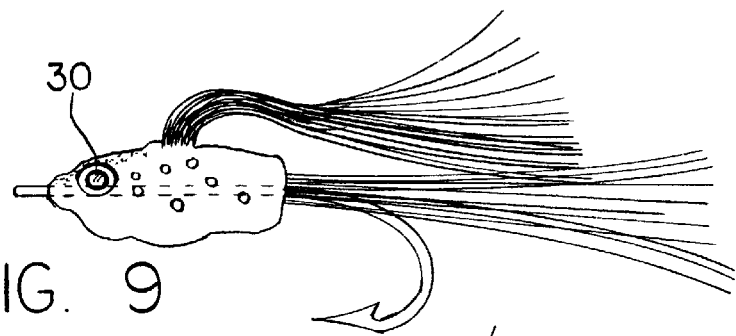
FIG. 9 is a large bodied fly made from wrapped chenille.
Figure 10:
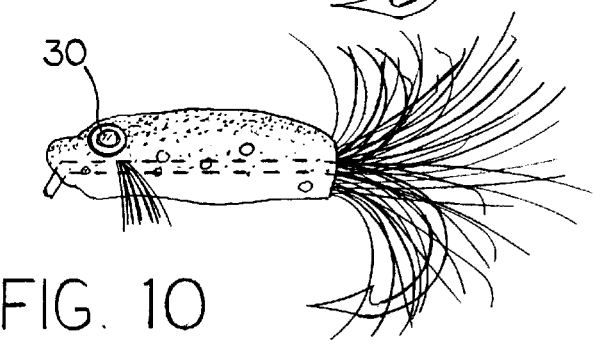
FIG. 10 is a large bodied fly with water borne acrylic emulsion affixed body parts (fins and tail).

Another technique within the method of the invention is the use of chenille with the water borne acrylic emulsion to form insect bodies. Examples of fly tied using chenille are shown in FIGS. 9 and 10. Chenille is a yarn with a velvety or furry surface. Strips of chenille are typically tied to fishing flies to form body parts. In the prior art the chenille yarn is tied to the hook and wrapped around the hook in a spiral and tied off at the other end of the fly. This can distort the thickness and surface of the chenille by the required tightness of the wrap. The practice of the method of the invention allows the chenille to be tied on in a longitudinal manner, horizontally, spirally, or in combination of these, and secured to the hook, and then saturated with clear water reducible water borne acrylic emulsion, with or without the need for the spiral of thread. Body parts can be differentiated by colors of water borne water borne acrylic emulsion, to form the underside and legs of a caterpillar, grub, or larval insect, by being painted a selected or mixed color on the chenilled hook. Then dots of color can be added to other parts, glitter added, and the entire painted fly cured and heat treated. The hardening of the paint secures the chenille threads together, and unifies the fly to the hook. Chenille treated in this way can also be worked almost like putty, and formed into various shapes before heat treating. Previously tied chenille flies can be softened by the heat treatment, and reshaped into different shapes while still warm. The water borne acrylic emulsion thus eliminates some tying, and results in a unique fly. The heat treatment not only adds durability, but also shrinks synthetic (plastic) glitter and makes a glitter treated surface into an iridescent surface, with more subtle and natural coloration than glitter provides. Metallic glitter does not shrink or change color.

Water borne acrylic emulsions can be used to form body parts of flies, and body parts which are remote from the body of the fly, such as joints (26), feet (28), and antennae tips. By body parts is meant the three major body parts of insects (head, thorax, and abdomen) as well as the other body parts listed in this specification. These include such parts as the thick thighs of grasshoppers, bulbous knee joints of many insects, the back-turned foot of grasshoppers and other insects, insect antennae, the tubular body of worm-like creatures, the eyes of creatures real and imagined which have prominent eyes, egg cases, wings and wing covers, gills and gill covers, mouth parts, eggs, nymphs and larval stages of insects, and body protrusions such as horns, fins, bumps, and spines. What is not meant by body parts is a thin coating over the surface of a fly or lure, which inherently has a thickness and shape but has an insubstantial thickness, and does not form a recognizable body part of an aquatic creature.

Since these water borne acrylic emulsions are heavier than water when cured and heat treated, if the emulsions are used to create large body parts of an insect, it is likely that the fishing fly will sink in the water. If a fly is desired which floats on top of the water rather than sinks, the water borne acrylic emulsion can be mixed with fine granules of a foam such as styrofoam, to form a colored paste (FIG. 7), and foam wings or body parts can also be imbedded in the emulsion while it is wet. The color is determined by mixing from a selection of colors to arrive at the desired color. In such a water borne/foam paste, the body parts of an insect are formed on the hook from the paste. When these dry, other features can be added to these body parts, such as eyes (16).

Before the body parts have cured, appendages such as legs (18), wings (20), wing covers, fins, eggs (12), egg sacks, spines (22), quills, plates, gills, gill plates, scales and antennae (24) can be inserted into the paste. These appendages can be made from conventional fly-tying materials such as hair and feathers, or other material such as plastic, foil, foam or other materials. In this way, the water borne acrylic emulsion can serve not only to simulate body parts, but it can also serve to attach appendages to the fly. Use of the water borne acrylic emulsion in this way eliminates the painstaking step of tying material to the hook.

Figure 3:
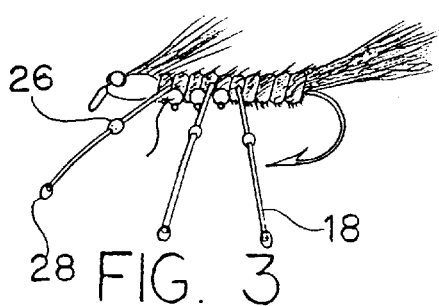
FIG. 3 is a side view of a fishing fly made using water borne acrylic emulsion for the head, eye, knee joint, and weights which are disguised as egg cases.
Figure 4:
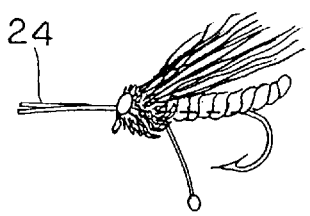
FIG. 4 is a side of a fishing fly which simulates a bee or yellow jacket.
Figure 5:
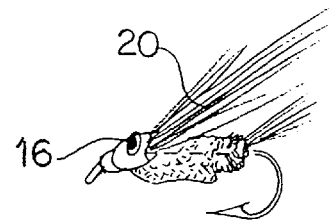
FIG. 5 is a side view of a fishing fly in which the head, eye, thorax and part of the abdomen are made of water borne acrylic emulsion, and the wings have been colored fluorescent orange.
Figure 6:
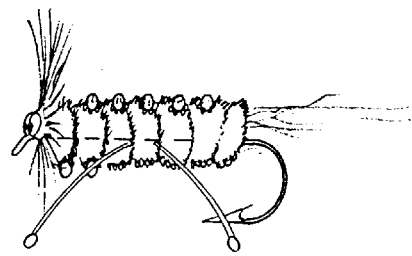
FIG. 6 is a side view of a fishing fly in which the feet, head, eye, egg cases, and hatched young are formed form water borne acrylic emulsion.

The water borne acrylic emulsion can also be used as a means of attaching weights to a fly, and disguising those weights as a body part of the fly, such as egg cases, head, and attached insect young. In this way, beaded weights of lead, bismuth or other heavy materials can be incorporated into the fly as it is constructed, or added onto the completed fly in the field, resulting in a natural looking fly with the desired weight, without the requirement of tying on to the fly. An example of the attachment of weights to flies is shown in FIG. 3 at (12).

Figure 7:
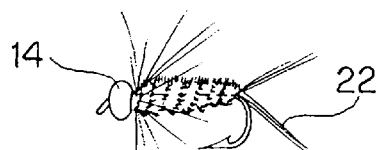
FIG. 7 is a side view of a fishing fly in which the abdomen and head are made of water borne acrylic emulsion and the tail and wings are anchored in the water borne acrylic emulsion.
Figure 8:
FIG. 8 is a side view of a fishing fly which simulates a fish egg, using fluorescent orange water borne acrylic emulsion.

In the same manner, beads of styrofoam or other buoyant material such as particles of wood, cork, or plastic can be incorporated into the body of the fly and disguised as head, thorax, egg cases, leg joints, feet or other body parts, as shown in FIGS. 7, 14. Once covered with the appropriate color of water borne acrylic emulsion, speckling by the use of glitter, striping by the use of other colors of water borne acrylic emulsion, or other disguising, the fly will have the desired buoyancy characteristic without the requirement of tying materials to the fly, and will have a more natural appearance than simply tying styrofoam to the fly. If open-celled foam is used as a body part, the water borne acrylic emulsion can be used to seal the pores of the outside layer of cells, which will make the foam less absorbent.

The water borne acrylic emulsion is shaped on the hook or on the fly materials, according to the particular specifications of the fly pattern being made, according to the anatomical features of the insect being imitated, or according to the desired characteristics of a fanciful fly creation.

The water borne acrylic emulsions can be applied in layers cured and heat treated, which creates a multi-layered solid which has the appearance of depth and can have reflective properties if glitter has been applied in one of the layers.

The water borne acrylic emulsion, alone or mixed with other materials, such as foam, glitter, plastic, hair, or fur, can be used to create protrusions in the fly body which result in the fly making side to side or oscillatory movements when retrieved. This motion can create a more natural presentation to the fish and cause the fish to strike. Such body part protrusions utilizing water borne acrylic emulsion as dimensioning material can also result in modification of the wake of the fly as it is retrieved, or as it creates a wake in moving water. The body protrusions can be adjusted to change this wake and make it more lifelike in appearance. The action of the fly moving through the water and the appearance of the wake together can make a more natural presentation and result in more fish strikes.

The water borne acrylic emulsion is compatible with traditional fly tying materials such as hair, feathers and string. They are also compatible with such non-conventional material as tinsel, plastic, rubber and glitter. By applying water borne acrylic emulsion to these materials to change their colors, the required inventory of fly tying supplies need to be much smaller.

Figure 12:
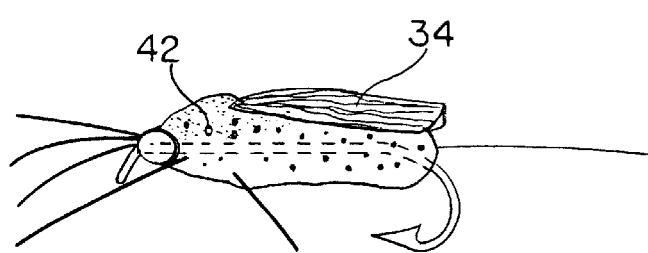
FIG. 12 is a fly with water borne acrylic emulsion and fiber wings.

Another preferred embodiment of the invention utilizes waterborne acrylic emulsion as a matrix for the entrapment of gaseous bubbles. A fly using this method is shown in FIG. 12, with entrapped bubbles 42. This effect can be used to create buoyant effects in flies, making them float, or creating a neutral buoyancy of the fly in the water. Creating bubbles within the water borne acrylic emulsion can be done in two forms. In the first form, clear water reducible water borne acrylic emulsion is applied to fly-tying materials on a hook, typically to saturation. This partially-formed fly is then cured, and subjected to a heating step, which causes bubbles to form within the clear water reducible water borne acrylic emulsion. The fly-tying material is preferably a chenille, which serves as a matrix for the bubbles which are generated by the heat. Other fibrous materials can be used, such as polyester, polypropylene, nylon or rayon. The saturated chenille is cured for 3 to 8 hours, before the heat treatment step is begun. The heat treatment step of 30 to 40 minutes at 150° to 175° F. results in good bubble formation and acceptable change of glitter and/or color. If this heat treatment step is continued, the bubbles formed within the fibrous matrix can be made to shrink, and therefore lose buoyancy. In this way, the degree of buoyancy of the fly can be adjusted and controlled. Buoyancy can also be totally eliminated by the use of the heating process. After a three to eight hour curing time, subjecting a clear water borne acrylic emulsion saturated fly to 150° to 175° F. for greater than 40 minutes at the same temperature begins to degrade the air bubbles and decrease the buoyancy of the fly.

The creating of bubbles in the clear water borne acrylic emulsion water reducible paint can also be used to create a membrane which has buoyancy properties and which can be attached in various ways to the fly. The membrane can be trimmed to the shape of wings or wing covers, and attached to a fly by tying with string or by adhering with water borne acrylic emulsion or glue. The membrane is formed by fixing fibers, such as polyester threads, to a flat surface, and applying clear water borne acrylic emulsion to a flat surface. The fibrous material used can be chopped polypropylene, nylon fibers, acrylic fibers, plastic fibers of any type, wool, or any natural or synthetic fiber. The purpose of the fiber is to add strength to the layer and/or layers of water borne acrylic emulsion after it has been cured and heat treated, and also to provide color to the resulting membrane. The membrane can be made thinner by the application of pressure, either heated or unheated. Although generally flat, the flat surface can also have surface indentations in the form of scale patterns or vein patterns. The flat surface can also have cavities in the general form of wings or other body parts. The water reducible water borne acrylic emulsion is applied to a flat surface as a layer over the entire flat surface, as layers in the voids, or as a layer on certain areas of the flat surface. To the clear acrylic paint on the flat surface is added fibrous material for strength. After a curing period, layer or layers on the flat surface peeled off and is subjected to a preliminary heating step, which causes bubbles to form within the clear paint, and around the fiber matrix. The flat surface can be metal, foil, waxed paper, glass, plastic, or any surface from which the layer of clear reducible water borne acrylic emulsion, bubbles and fibers can be removed after curing.

The layer of water reducible water borne acrylic emulsion, gas bubbles and fibers comes off the flat surface as a membrane, and can be like a sheet of paper, or as individual wings formed in voids or regions of the flat surface. Once removed from the flat surface, the membrane can be trimmed to form wings and wing covers, or rolled into a tube, shaped by compression, cut to desired shape and/or shaped by a suitable mold to form the body parts of the fly. The body part made of this membrane is then attached to the fly, and is preferably subjected to a final heat treatment for durability. A heating step of 10 to 15 minutes at 100° to 175° F. provides for good bubble formation. Additional heating time will result in reduced bubble formation on a sinking or neutral material, and will make the membrane too hard for good durability. The loss of flexibility will hinder the membrane body part in its ability to be shaped and tied to flies.

Figure 11:
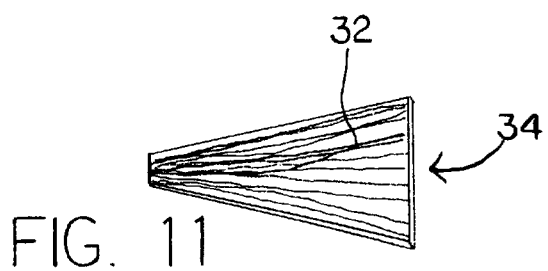
FIG. 11 is a membrane for use in constructing a fly.
Figure 13:
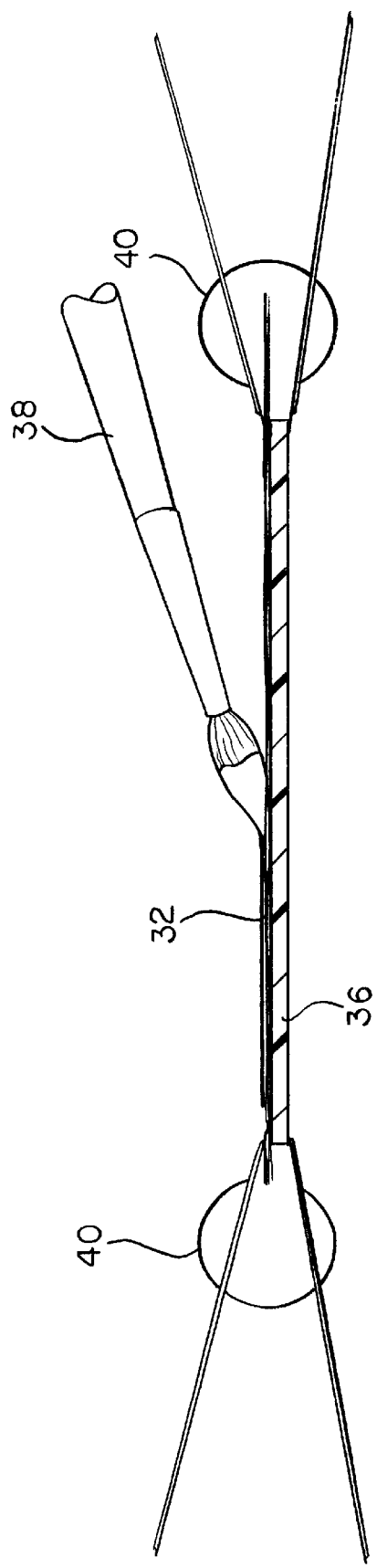
FIG. 13 shows the method of making a fiber reinforced membrane for use in fly tying.

A second method of creating bubbles in the clear water reducible water borne acrylic emulsion is to create a membrane which has buoyancy properties and which can be attached in various ways to the fly. The membrane can be trimmed to the shape of wings or wing covers, and attached to a fly by tying with string or by adhering with liquid water borne acrylic emulsion or glue. A membranous wing made in this manner is shown in FIG. 11, and is shown attached to a fly in FIG. 12. The process of making the membrane is shown in FIG. 13. The membrane is formed by fixing fibers 32, such as polyester threads, to a flat surface 36, and applying clear water reducible water borne acrylic emulsion to the fibers 32 on the flat surface 36. Although a brush 38 is shown, other means of application are equally suitable. The fibers 32 are shown clamped in place, by clamps 40. Any suitable means of holding the fibers 32 in place while the clear water reducible water borne acrylic emulsion is applied is suitable for practicing the invention. The fibrous material used can be chopped polypropylene, nylon fibers, acrylic fibers, plastic fibers of any type, wool, or any natural or synthetic fiber. The purpose of the fiber 32 is to add strength to the layer of water borne acrylic emulsion after it has cured, and also to provide color to the resulting membrane. The membrane can be made thinner by the application of pressure, either while being heated or unheated. Although generally flat, the flat surface 36 can also have surface texture of indentations in the form of scale patterns or vein patterns. The flat surface can also have cavities in the general form of wings or other body parts. The emulsion is applied to a flat surface as a layer over the entire flat surface, as layers in the voids, or as a layer on certain areas of the flat surface.

After a curing period, the layer of clear water borne acrylic emulsion on the flat surface is subjected to a preliminary heating step, which causes bubbles to form within the clear paint, and around the fiber matrix. The flat surface 36 can be metal, foil, waxed paper, glass, plastic, or any surface from which the layer of clear paint, with entrapped bubbles and fibers can be easily removed after curing. Wax paper has proven suitable for this use.

After a curing period of 3–6 hours, the layer of water borne acrylic emulsion, gas bubbles and fibers comes off the flat surface as a membrane, and can be like a sheet of paper, or as individual wings formed in voids or regions of the flat surface. Once removed from the flat surface, the membrane can be trimmed to form wings and wing covers, or rolled into a tube to form the body parts of a fly. The body part made of this membrane is then attached to the fly, and is preferably subjected to a final heat treatment for durability and hardness. A preliminary heating step of 30 to 40 minutes at 150° to 175° F. provides for good bubble formation. Additional heating time will result in reduced bubble formation and a sinking or neutral material.

A three step process to eliminate bubble formation can also be used. This involves 1) curing for 6 to 8 hours 2) heat treating in oven at "WARM" setting for 3 to 8 hours or longer 3) heat treating at 100°–175° F. or higher for 30 to 60 minutes, and allowing to cool. In certain situations the bubbling or gas entrapment between the coats of clear water borne acrylic emulsion cause separations during heat treatment, after the ambient curing step. This is common when the thread (mono-filament) is utilized to blend coloration materials. The gas or air bubbles separate the final finish coat from the mono-filament and prevent good bonding by becoming somewhat of a barrier between the coloration materials. A three step curing and heat treatment process will prevent this from happening and provide a clearer and more distinct finish without a fogging effect from heavy bubbling. The three step process can also be utilized to keep eye spots, legs, wings, and other body parts clearer.

Another way to prevent bubbling is to utilize a low temperature heat treatment for a longer period of time. For example, a fly or body part is placed in an oven on the warm setting for 3 to 8 hours or longer, after a cure step of 3 to 8 hours.

Eyes 30 can be formed using water borne acrylic emulsion, by placing concentric circles of different colors on a flat surface. Examples of this type of eye are shown in FIGS. 9 and 10. In the preferred embodiment, waxed paper is used, to which a clear water borne acrylic emulsion is added in drops. Glitter is added while the water borne acrylic emulsion is wet and further additions of colored clear water borne acrylic emulsion may be added to delineate pupils and corneas. A black pupil is preferably added when the previously applied drops of clear are semi-dry. A final coat of clear over the pupil is preferably added once the eye is on the fly. The eye is allowed to cure overnight, or for 6 to 8 hours, minimum. A heat treatment can then be utilized to more rapidly dry the eye. These eyes can be removed from the non-stick surface and used on any fly. One method of attaching eyes to a fly, especially one made from waterborne acrylic emulsion, is to an eye region on the fly using clear water reducible paint. To the eye region, and eye spot is applied. Additional clear paint is applied around the edges of the eye spot, and over the top surface of the eye spot. The fly should then be heated for an additional 15 minutes for durability. In this manner, the eye spots and the clear water borne acrylic emulsion chenille become homogeneous. Sheets of such eye spots can be produced, and be made available for the fly tier. When attaching dye spots, wings, fins, legs, antennae, etc. during the heat treatment process, the clear water borne acrylic emulsion that is utilized as the glue. For example, an eye spot does not have to be cured at ambient temperature for fusion and attachment to take place. However, a curing period at ambient temperature could be incorporated into this attachment process.

Other fly body parts can be made utilizing the air bubble formation technique described above. For example, grasshopper legs can be made by using fibers or thread and clear water reducible water borne acrylic emulsion. The grasshopper leg can be painted on to a flat, non-stick surface, allowed to dry, peeled from the non-stick surface, trimmed, heat treated to form bubbles and to enhance durability, and joined to a water borne acrylic emulsion saturated and partially dry chenille-based fly. This leg could also be attached to a non-saturated chenille fly body or other natural or synthetic fly body. This leg does not need to be heat treated if the fly that is attached to by tying or by utilizing the clear acrylic paint as the glue to attach it to the fly body, if this fly is to be cured and then heat treated. Color and glitter can be added before or after a heat treatment, which is also optional. The grasshopper legs can be heated to join them to the chenille based fly, causing them to fuse together.

Fresh and salt water popper-type flies, or other full bodied flies with scoops can also be created using this method. Chenille is applied to a hook, and saturated with clear paint. This is allowed to cure, and then subjected to a heat treatment step to create bubbles. For larger hooks, one or two layers of chenille may be preferable. This is cured for 3 to 8 hours and treated at 100° to 175° for 30 minutes or longer.

The water borne acrylic emulsion can be used as the sole material of which the fly is composed, or it may be used in conjunction with a plurality of synthetic and/or natural fly tying materials.

The water borne acrylic emulsion can be used in conjunction with traditional fly tying patterns to augment or modify those patterns. The water borne acrylic emulsions can also be used to create more accurate and non-traditional simulations of naturally occurring insects or other fresh and salt water creatures. The water borne acrylic paint can also be used to create fanciful creatures which have colors, shapes and appendages which are not found in nature.

The advantages of the present invention are many fold: Elimination of some or all of the requirement of tying of materials on to the fly; permanent flotation of flies, including large-bodied flies; providing a method to add weight to flies, either incorporated into the design or added as necessary in the field; providing a method for adding color to body parts of the fly; providing a method of changing the color of flies, including in the field, and providing a convenient method to add body parts, such as eyes, feet, fins, leg joints, gills, gill plates, scales, egg sacks, insect babies, spines, quills, plates, antennae and knee joints, which are difficult to tie using traditional fly tying methods. The light weight of the material, especially when mixed with foam beads or granules, aids in the flotation of dry flies, for a more realistic presentation to the fish, and does not interfere with the casting technique of the user.

Although but six embodiments of the present invention have been illustrated in FIGS. 3, 4, 5, 6, 7 and 8, it will be apparent to those skilled in the art that various changes and modifications in patterns may be made herein, without departing from the spirit of the invention.

While there is shown and described the present preferred embodiment of the invention, it is to be distinctly understood that this invention is not limited thereto but may be variously embodied to practice within the scope of the following claims.

I claim:

1. A method for constructing a fly for fishing from fly-making materials and a hook which comprises:

tying fly-making materials to a hook;

applying colorful water reducible water borne acrylic emulsion to said fly-making materials or to said hook;

shaping said water reducible colorful water borne acrylic emulsion to create colored body parts of said fly;

drying said fly for at least 3 minutes at ambient temperature;

applying clear water borne acrylic emulsion to cover said fly;

curing said fly for 3 to 8 hours at ambient temperature; and heat treating said fly at 100° to 175° for 30 to 60 minutes.

2. The method of claim 1 which further comprises using water borne acrylic emulsion as an adhesive to attach fly making materials to said fly.

3. The method of claim 1 which further comprises using water borne acrylic emulsion to attach one or more weights to said fly.

4. The method of claim 1 which further comprises embedding glitter in water borne acrylic emulsion.

5. A fly fishing lure which comprises:

a hook;

fiberous fly making materials:

body parts on said hook which are made of water borne acrylic emulsion and clear water borne acrylic emulsion, and which simulate a body part of a fly; and fly making materials such as weights, floatant devices, or other materials which are attached to said fly; wherein fiberous material is attached to said hook, and saturated with said clear water borne acrylic emulsion;

said water reducible water borne acrylic emulsion is applied to said hook, is dried for 3–20 minutes at ambient temperature, and coated with a layer of clear water borne acrylic emulsion, cured at ambient temperature for 3 to 8 hours, and heat treated at 100° to 175° for 30 to 60 minutes.

6. The fly fishing lure of claim 5 in which water borne acrylic emulsion is used to change said color of fly fishing materials previously assembled on said fly.

* * * * *